No. 610,220. Patented Sept. 6, 1898.
J. C. WOODCOCK.
GRINDING MILL.
(Application filed July 9, 1897.)
(No Model.)

Witnesses
Grant Burroughs.
R. H. McPherson Jr.

Inventor
John C. Woodcock,
By his Attorneys,
Finckel & Finckel.

UNITED STATES PATENT OFFICE.

JOHN C. WOODCOCK, OF CHILLICOTHE, OHIO.

GRINDING-MILL.

SPECIFICATION forming part of Letters Patent No. 610,220, dated September 6, 1898.

Application filed July 9, 1897. Serial No. 644,007. (No model.)

*To all whom it may concern:*

Be it known that I, JOHN C. WOODCOCK, a citizen of the United States, residing at Chillicothe, in the county of Ross and State of Ohio, have invented certain new and useful Improvements in Grinding-Mills; and I do hereby declare the following to be a full, clear, and exact description of the invention, such as will enable others skilled in the art to which it appertains to make and use the same.

The object of my present invention is to make an improvement upon the type of feed-mill illustrated in my Patent No. 546,869, dated September 24, 1895; and the invention consists of an antifriction-bearing adapted to be removably interposed between the spider of the outer cone and the hub of the spider at the bottom of the hopper, so that the hopper and the inner cone, which is suspended from the spider at the bottom thereof, shall run with less friction and less expenditure of power than heretofore.

Figure 1:
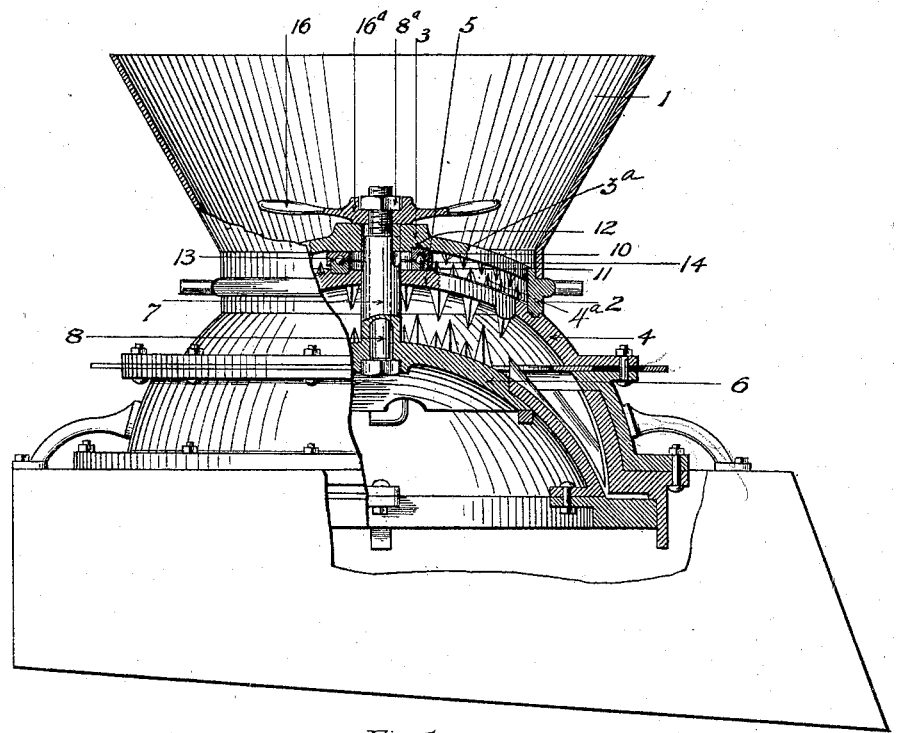
Figure 2:
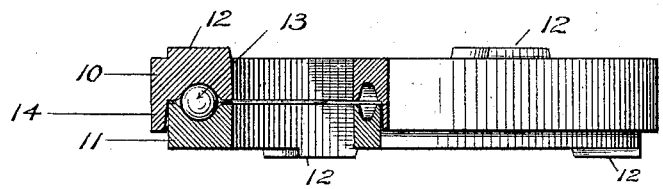
Figure 3:
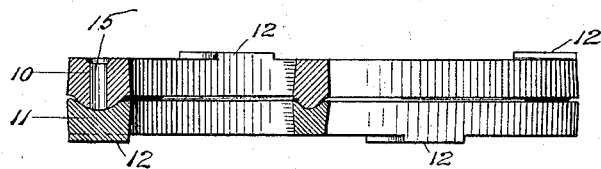

In the annexed drawings, illustrating an embodiment of my invention, Figure 1 is an elevational view, partially in central vertical section, showing my improvement applied. Fig. 2 is a view on a larger scale, partially in section, showing my bearing removed; and Fig. 3 is a view of the same kind, showing a modification of the invention.

1 designates the hopper; 2, the spidered lever-ring at the base of the hopper. The horse-power lever is attached to this ring, as set forth in my former patent referred to.

3 designates the perforated hub or center of the spider. The arms of the spider are provided with grinding-teeth $3^a$.

4 designates the outer cone, that is of spider form at its upper portion and also has a solid perforated apex part 5 and grinding-teeth $4^a$ on the spider-arms.

6 designates the inner cone, the hollow stem or post 7 of which passes vertically upward through the openings in the parts 3 and 5. The upper end of the stem is grooved longitudinally with rounded grooves to receive splines in the hub 3, and a threaded king-bolt 8, the head of which engages a socket in the under side of the cone, passes up through the hollow stem 7, and has its upper end provided with an adjustable nut $8^a$, so that the inner cone may be adjusted with respect to the outer cone, all substantially as in my former patent. The nut 8 may be turned at any time by means of a double-handled wrench 16, having a socket $16^a$ to fit upon the nut.

Between the hub 3 and the portion 5 of the outer cone I now propose to place a removable bearing. This bearing consists, essentially, of two rings 10 and 11, having lugs or projections to fit in correspondingly-shaped recesses or sockets in the under side of the part 3 and in the upper side of the part 5. In Fig. 2 both rings are grooved on their adjacent faces, so that balls 13 may be placed between them, and in this view the upper ring 10 is shown as made with a downwardly-projecting flange 14, that closes the space between the two rings, thereby preventing the ingress of dust and particles to the bearing. In Fig. 3 the lower ring is shown as grooved, while the upper one has a corresponding projection to run in said groove. In this figure I have also shown a hole 15, through which oil may be introduced to lubricate the bearing. Owing to the fact that the bearing is removable it may when worn or damaged be replaced by a new one.

My present improvement being very economical in construction mills containing it may be supplied to the public without any appreciable increase in the price of the mill.

What I claim, and desire to secure by Letters Patent, is—

1. In a grinding-mill, the combination of the inner grinding-cone 6 having an upwardly-projecting stem 7, the outer grinding-cone 4 having an apertured hub 5 to receive said stem and spidered at its upper part with teeth on the spider-arms, ring 2 rotatably seated on the outer cone having an apertured hub 3 keyed to the stem 7 and also provided with toothed spider-arms, and two bearing-rings 10 and 11 having horizontal bearing-surfaces and projections 12 to engage the hub 5 and hub 3, substantially as shown and described.

2. In a grinding-mill, the combination of the inner grinding-cone 6 having an upwardly-projecting stem 7, the outer grinding-cone 4 having an apertured hub 5 to receive said stem and spidered at its upper part with teeth on the spider-arms, ring 2 rotatably seated on the outer cone and having an apertured hub 3 keyed to stem 7 and also provided with toothed spider-arms, and two bearing-rings 10 and 11 having horizontal bearing-surfaces and projections 12 to engage hubs 5 and 3, and a depending flange 14 on the upper ring 10, substantially as shown and described.

In testimony whereof I affix my signature in the presence of two witnesses.

JOHN C. WOODCOCK.

Witnesses:
    THOS. STEVENS,
    LUTHER B. YAPLE.